(12) United States Patent
Yamamoto et al.

(10) Patent No.: US 12,111,476 B2
(45) Date of Patent: Oct. 8, 2024

(54) IMAGE DISPLAY APPARATUS

(71) Applicant: CANON KABUSHIKI KAISHA, Tokyo (JP)

(72) Inventors: Yasufumi Yamamoto, Kanagawa (JP); Yusuke Sasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/165,982

(22) Filed: Feb. 8, 2023

(65) Prior Publication Data
US 2023/0258947 A1    Aug. 17, 2023

(30) Foreign Application Priority Data

Feb. 14, 2022   (JP) .................................. 2022-020614

(51) Int. Cl.
*G02B 27/01* (2006.01)

(52) U.S. Cl.
CPC ..... *G02B 27/0176* (2013.01); *G02B 27/0179* (2013.01); *G02B 2027/0159* (2013.01)

(58) Field of Classification Search
CPC ............ G02B 27/0176; G02B 27/0179; G02B 2027/0159; G02B 2027/0132; G02B 2027/0134; G02B 2027/0178; G02B 27/0172; G02B 27/02; G02B 25/001; G02B 7/023
See application file for complete search history.

(56) References Cited

U.S. PATENT DOCUMENTS

| | | | |
|---|---|---|---|
| 5,978,015 A * | 11/1999 | Ishibashi | H04N 13/373 348/E13.052 |
| 2017/0227772 A1* | 8/2017 | Tomine | G02B 5/04 |
| 2020/0214562 A1* | 7/2020 | Kawasaki | G09F 9/00 |
| 2021/0199947 A1* | 7/2021 | Saito | G02B 9/34 |
| 2021/0199975 A1* | 7/2021 | Matsumoto | G02B 27/0172 |

FOREIGN PATENT DOCUMENTS

JP        09-068670 A       3/1997

* cited by examiner

*Primary Examiner* — Sahlu Okebato
(74) *Attorney, Agent, or Firm* — Cowan, Liebowitz & Latman, P.C.

(57) ABSTRACT

An image display apparatus includes a display device configured to display an image to a user, an eyepiece optical system configured to guide the image displayed on the display device to the user, and a guide mechanism configured to move the display device in an optical axis direction of the eyepiece optical system. The guide mechanism guides a movement of the display device on both sides of the display device in a direction orthogonal to an optical axis of the eyepiece optical system, and overlaps the eyepiece optical system when viewed from the optical axis direction.

10 Claims, 8 Drawing Sheets

IMAGE DISPLAY APPARATUS

BACKGROUND

Technical Field

One of the aspects of the disclosure relates to an image display apparatus that includes a mechanism that can adjust diopter.

Description of the Related Art

An image display apparatus has conventionally been proposed, which has a mechanism for adjusting the diopter of a user by moving either a display device or an eyepiece optical system in an optical axis direction of the eyepiece optical system according to the diopter and an object distance of a displayed image (see Japanese Patent Laid-Open No. 9-68670).

In the conventional image display apparatus that includes a bending optical system or the like for a thinner configuration, the eyepiece optical system may become large in a direction orthogonal to the optical axis. In this case, since part of the diopter adjusting mechanism is located farther from the optical axis than the eyepiece optical system in the conventional image display apparatus, the image display apparatus becomes large in the direction orthogonal to the optical axis.

SUMMARY

One of the aspects of the embodiment provides an image display apparatus that can be thin and small in a direction orthogonal to an optical axis.

An image display apparatus according to one aspect of the disclosure includes a display device configured to display an image to a user, an eyepiece optical system configured to guide the image displayed on the display device to the user, and a guide mechanism configured to move the display device in an optical axis direction of the eyepiece optical system. The guide mechanism guides a movement of the display device on both sides of the display device in a direction orthogonal to an optical axis of the eyepiece optical system, and overlaps the eyepiece optical system when viewed from the optical axis direction.

Further features of the disclosure will become apparent from the following description of embodiments with reference to the attached drawings.

DESCRIPTION OF THE EMBODIMENTS

Figure 1:
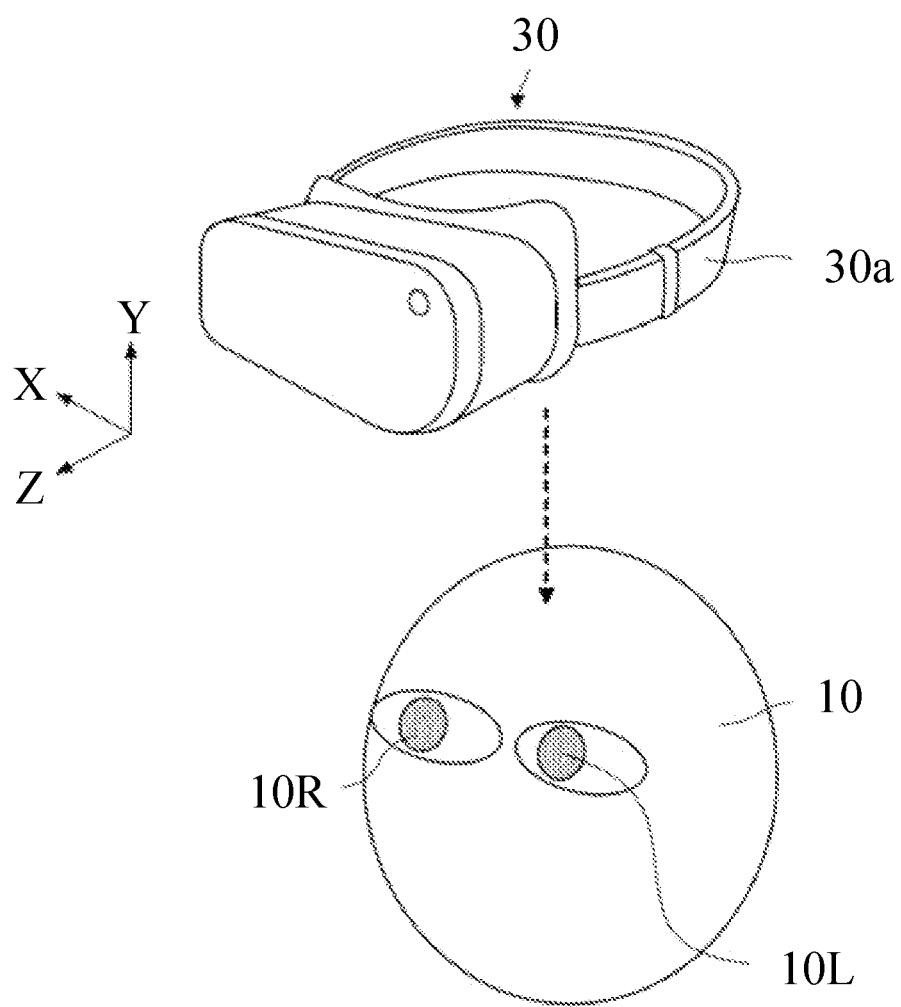
FIG. 1 is an external view of a head mount display (HMD) as an example of an image display apparatus according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is an external view of a head mount display (referred to as HMD hereinafter) 30 as an example of an image display apparatus according to one embodiment of the disclosure. In the following description, a direction parallel to an optical axis of an eyepiece optical system mounted on the HMD 30 (optical axis direction) is set to a Z-axis direction, a direction in which a right eye 10R and a left eye 10L of a user (observer) are aligned (an arrangement direction of both eyes) is set to an X-axis direction, and a direction orthogonal to the X-axis direction and the Z-axis direction is set to a Y-axis direction. In the X-axis direction, a direction from the left eye 10L side to the right eye 10R side is set to a +X direction, and a direction from the right eye 10R side to the left eye 10L side is set to an −X direction. In the Y-axis direction, a direction from a chin side of the user to a parietal side of the user is set to a +Y direction, and a direction from the parietal side to the chin side is set to a −Y direction. In the Z-axis direction, a direction from the eye side of the user to a side of a display device that displays an image for the user is set to a +Z direction, and a direction from the display device side to the eye side of the user is set to a −Z direction.

The HMD 30 includes a belt portion 30a through which the HMD 30 is mounted on the head 10 of the user. The HMD 30 further includes a structure for the left eye 10L and a structure for the right eye 10R. The structure for the left eye 10L and the structure for the right eye 10R are approximately symmetrical with respect to the Z-axis direction. The user can observe the images displayed by the HMD 30 with the right eye 10R and the left eye 10L.

In the following description, those elements which are included in the structure for the left eye 10L are labeled with L, and those elements which are included in the structure for the right eye 10R are labeled with R. For example, regarding the display device 1 described below, the display device (first display device) included in the structure for the left eye 10L is expressed by 1L, and the display device (second display device) included in the structure for the right eye 10R is expressed by 1R. If it is unnecessary to distinguish the structure for the left eye and the structure for the right eye, a description will not use L or R.

First Embodiment

Figure 2A:
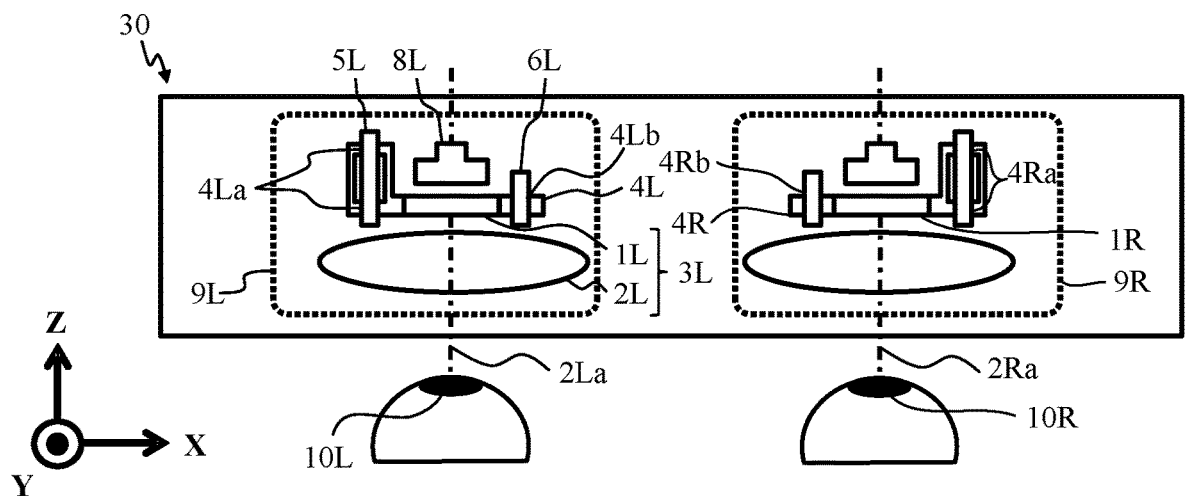
FIGS. 2A and 2B are configuration diagrams of an HMD according to a first embodiment.
Figure 2B:
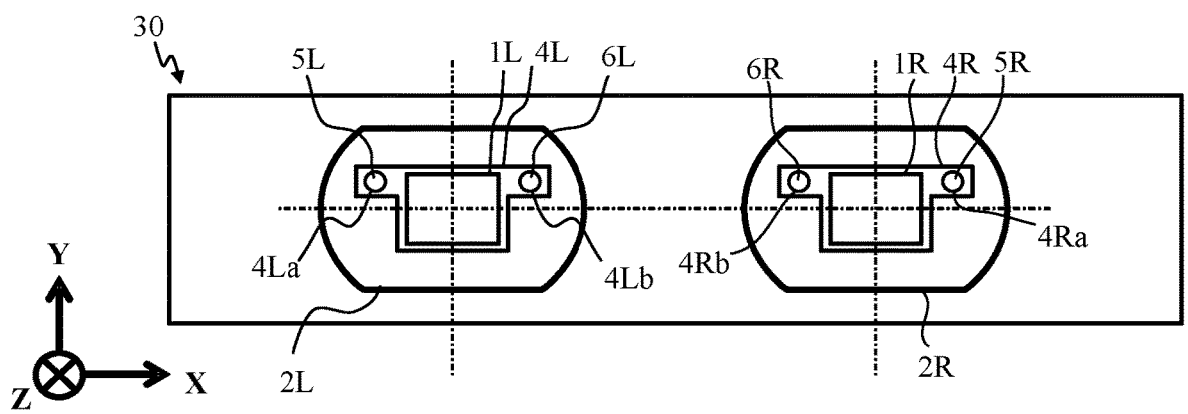

FIGS. 2A and 2B are configuration diagrams of an HMD 30 according to this embodiment. FIG. 2A schematically illustrates the HMD 30 viewed from the +Y direction side. FIG. 2B schematically illustrates the HMD 30 viewed from the −Z direction side. This embodiment will mainly discuss a structure 9L for the left eye 10L, but this is similarly applicable to a structure 9R for the right eye 10R.

The structure 9L includes an image display unit 3L, a holding member 4L, shaft members 5L and 6L, a driving unit 7L, and an imaging unit 8L. The image display unit 3L includes a display device 1L and an eyepiece optical system (first eyepiece optical system) 2L. The holding member 4L includes a first guide unit 4La and a second guide unit 4Lb, and is provided to a movable unit (not illustrated) that is movable in the Z-axis direction. The first guide unit 4La has two engagement holes that are aligned in the Z-axis direction parallel to an optical axis 2La of the eyepiece optical system 2L. The shaft member 5L is provided to a fixed unit (not illustrated) that is fixed in the Z-axis direction, and is engaged with (fitted in or inserted into) the two engagement holes in the first guide unit 4La. A positional relationship in the Z-axis direction between the first guide unit 4La and the shaft member 5L can be changed. The second guide unit 4Lb has a single engagement hole in the Z-axis direction. The shaft member 6L is provided to the fixed unit and engaged with (fitted in or inserted into) the one engagement hole in the second guide unit 4Lb. A positional relationship in the Z-axis direction between the second guide unit 4Lb and the shaft member 6L can be changed. The backlash between the shaft member 5L and the two engagement holes in the first guide unit 4La and the backlash between the shaft member 6L and one engagement hole in the second guide unit 4Lb are biased by a backlash biasing unit such as an unillustrated spring. Thereby, the holding member 4L and the shaft members 5L and 6L are disposed while their orientations are stable. The first guide unit 4La, the second guide unit 4Lb, and the shaft members 5L and 6L constitute a guide mechanism (first guide mechanism) configured to move the display device 1L in the Z-axis direction. A guide mechanism configured to move the display device 1R in the Z-axis direction will be referred to as a second guide mechanism. As long as the first guide unit 4La and the shaft member 5L are engaged at a plurality of locations and the second guide unit 4Lb and the shaft member 6L are engaged at fewer location(s), the number of engagement locations for each set is not limited.

In this embodiment, the first guide unit 4La is disposed outside the optical axis 2La in the X-axis direction when viewed from the centerline between the two optical axes 2La and 2Ra (or disposed farther from the centerline than the optical axis 2La in the X-axis direction). The second guide unit 4Lb is disposed inside the optical axis 2La in the X-axis direction when viewed from the centerline between the two optical axes 2La and 2Ra (or disposed closer to the centerline than the optical axis 2La in the X-axis direction). More specifically, the first guide unit 4La is disposed on the −X direction side of the display device 1L (the side opposite to the side where the display device 1R is disposed), and the second guide unit 4Lb is disposed on the +X direction side of the display device 1L. The first guide unit 4Ra provided to the holding member 4R is disposed on the +X direction side (the side opposite to the side on which the display device 1L is disposed) of the display device 1R. the second guide unit 4Rb is disposed on the −X direction side of the display device 1R.

While the holding member 4L includes the first guide unit 4La and the second guide unit 4Lb in this embodiment, it may include the shaft members 5 and 6. In this case, the first guide unit 4La and the second guide unit 4Lb are provided to the fixed unit.

The driving unit 7L (in FIGS. 4A and 4B) includes, for example, an actuator such as an ultrasonic motor or a voice coil motor, which is connected to the holding member 4L and drives the guide mechanism to move the display device 1L in the Z-axis direction. A diopter adjusting unit includes the guide mechanism and the driving unit 7L.

A display light beam of the image displayed on the display device 1L passes through the eyepiece optical system 2L and reaches the left eye 10L. The diopter adjusting unit adjusts the diopter by moving the display device 1L in the Z-axis direction to change the optical positional relationship between the display device 1L and the eyepiece optical system 2L. For example, in changing the diopter of the image display unit 3L to the infinity direction, the display device 1L is moved in the +Z direction, and in changing the diopter of the image display unit 3L to the close (short-distance) direction, the display device 1L is moved in the −Z direction.

In this embodiment, each of the image display units 3L and 3R includes the diopter adjusting unit. Therefore, the structures 9L and 9R can adjust the diopter and properly adjust the diopter even for a user who has a difference in vision between the left and right eyes.

The imaging unit 8L includes the image sensor and the imaging optical system, and is disposed on the +Z direction side of the display device 1L. The imaging unit 8L captures an image on the +Z direction side, and the obtained image can be displayed on the display device 1L.

The structures 9L and 9R are guided in the X-axis direction by their pupillary distance (PD) adjusting units (not illustrated). This configuration can perform the PD adjustment for adjusting an interval between the structures 9L and 9R in accordance with the PD corresponding to the distance between the left eye 10L and the right eye 10R. The PD may be obtained by an unillustrated detector, or may be obtained by manual operation based on user input.

This embodiment uses the eyepiece optical system 2 that is large in the X-axis direction and the Y-axis direction. Thereby, the size in the Z-axis direction can be reduced, for example, by using an optical system that uses polarization and reflection, and the HMD 30 can be made thinner.

In this embodiment, as illustrated in FIG. 2B, when viewed from the −Z direction side (the eye side of the user), the guide mechanism overlaps the eyepiece optical system 2 (or is located within a projection range of the eyepiece optical system 2). This configuration can prevent the guide mechanism from being located on the side of the eyepiece optical system 2 away from the optical axis 2a (side surface of the eyepiece optical system) in the direction orthogonal to the optical axis (X-axis direction or Y-axis direction), and can restrain the HMD 30 from being large in the direction orthogonal to the optical axis.

Figure 3:
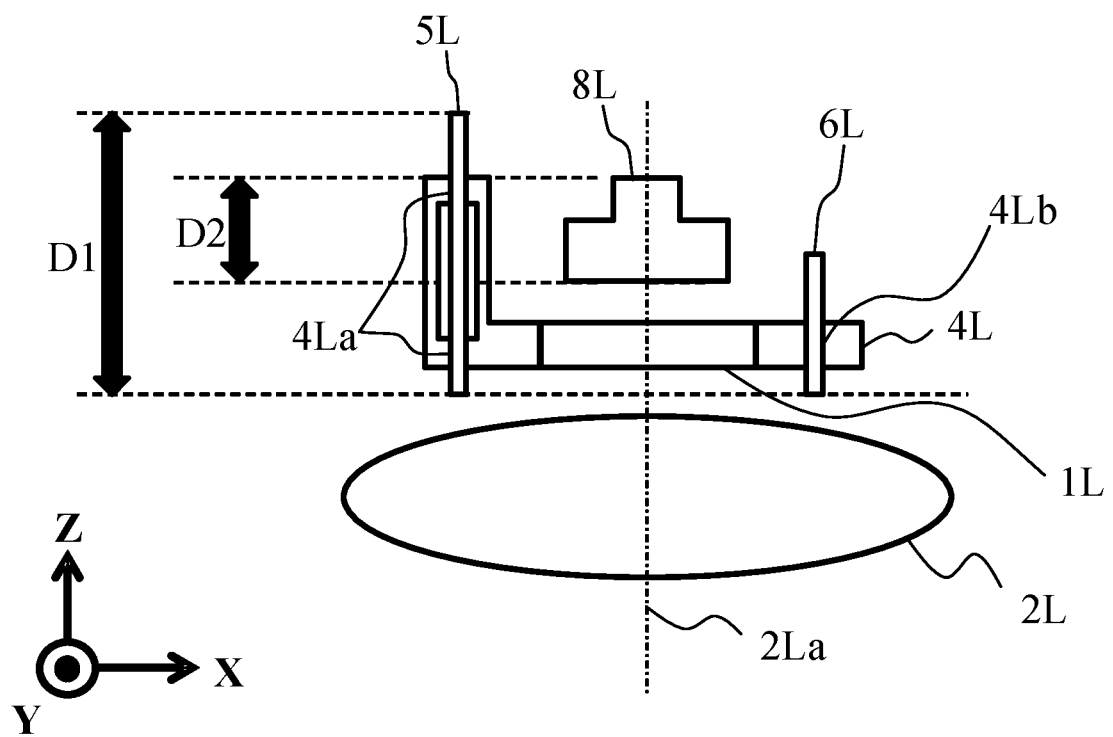
FIG. 3 explains a positional relationship between a guide mechanism and an imaging unit according to the first embodiment.

FIG. 3 illustrates a positional relationship between the guide mechanism and the imaging unit 8L. A positional range D1 of the guide mechanism in the Z-axis direction and a positional range D2 of the imaging unit 8L in the Z-axis direction overlap each other in the Z-axis direction, but they do not overlap each other in the X-axis direction. That is, this embodiment can make small the HMD 30 in the Z-axis direction by utilizing the space in the X-axis direction.

As illustrated in FIG. 2B, the guide mechanism guides a movement of the display device 1 on both sides of the display device 1 so as to sandwich the display device 1 in the X-axis direction. The guide mechanism is disposed on the +Y direction side with respect to the optical axis 2a of the eyepiece optical system 2 in the Y-axis direction, as illustrated in FIG. 2B. This configuration can suppress tilting moments of the first guide unit 4a, the second guide unit 4b, and the two shaft members 5 and 6 as fulcrums, and suppress twisting between the guide units and the shaft members. The guide mechanism may be disposed on the −Y direction side with respect to the optical axis 2a of the eyepiece optical system 2 in the Y-axis direction.

Figure 4A:
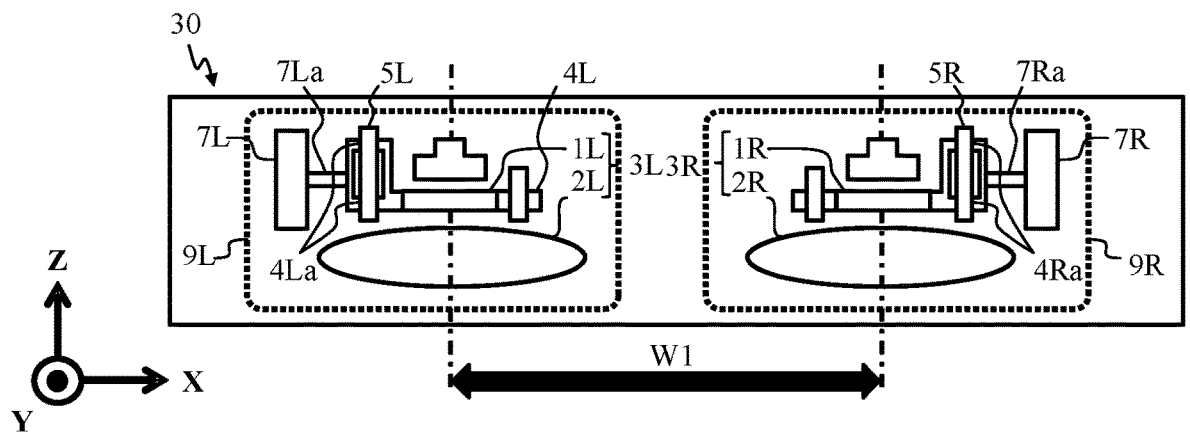
FIGS. 4A and 4B explain an arrangement of a driving unit according to the first embodiment.
Figure 4B:
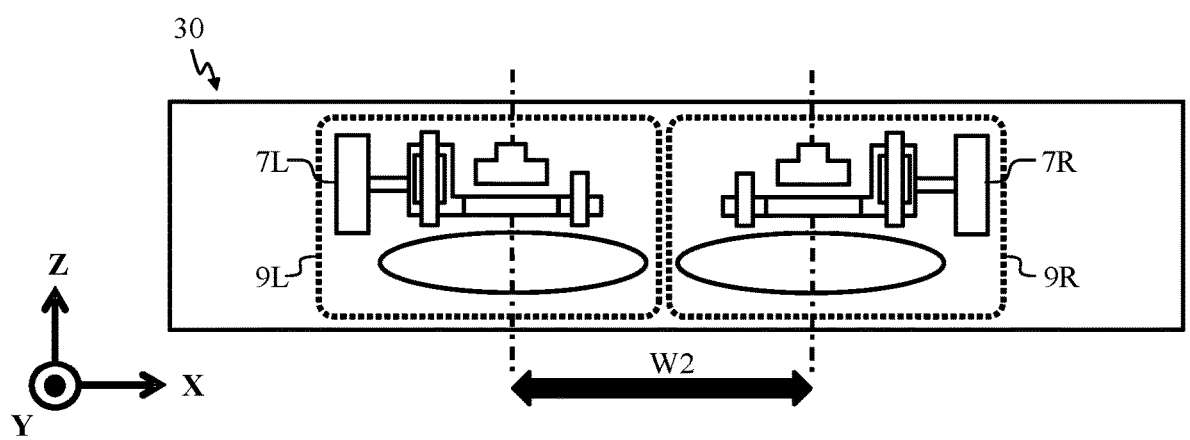
Figure 5A:
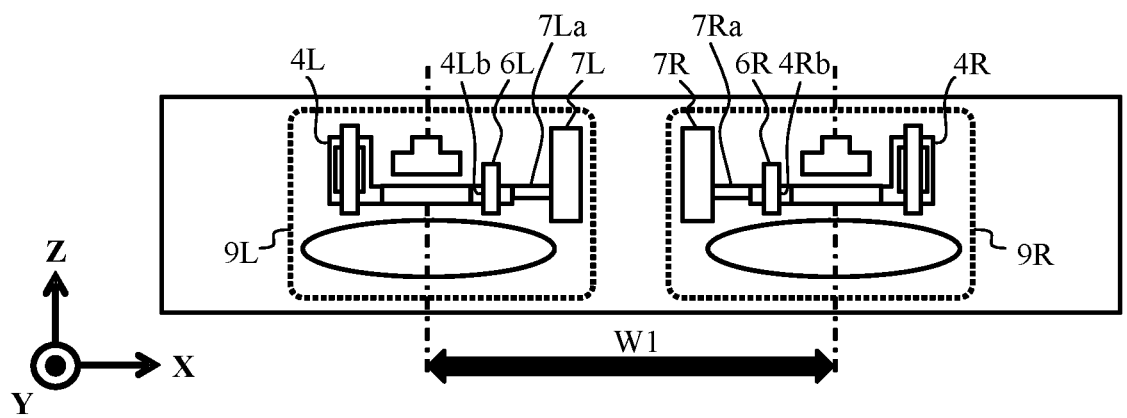
FIGS. 5A and 5B explain the arrangement of a driving unit according to a comparative example.
Figure 5B:
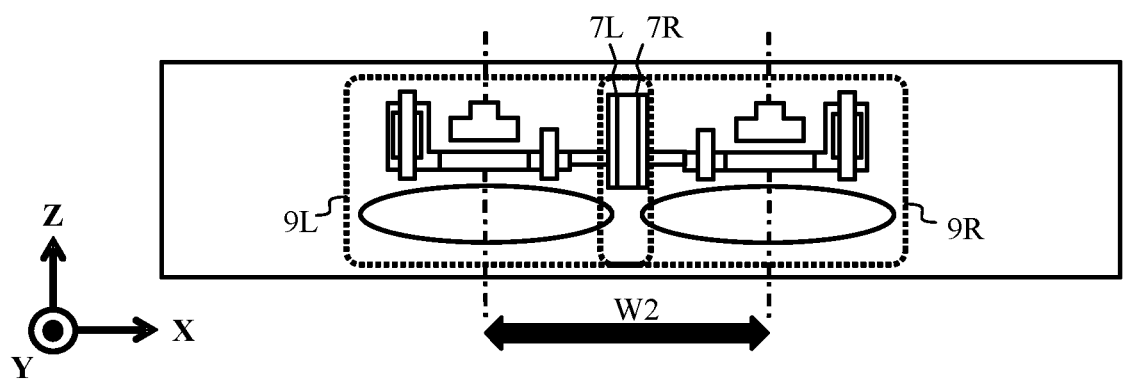

FIGS. 4A and 4B illustrate the arrangement of the driving unit 7. FIG. 4A illustrates the HMD 30 in a case where a distance between the image display units 3L and 3R corresponding to the PD is W1. FIG. 4B illustrates the HMD 30 in a case where the distance between the image display units 3L and 3R is W2, which is the shortest distance. The driving unit 7 includes a connector 7a connected to the holding member 4. The driving unit 7 and the holding member 4 are connected on the side where the first guide unit 4a and the shaft member 5 are disposed in the X-axis direction. In other words, the driving unit (first driving unit) 7L is connected to the guide mechanism (first guide mechanism) outside the optical axis (first optical axis) 2La of the eyepiece optical system (first eyepiece optical system) 2L when viewed from the centerline between the two optical axes 2La and 2Ra. The driving unit (second driving unit) 7R is connected to the guide mechanism (second guide mechanism) outside the optical axis (second optical axis) (2Ra) of the eyepiece optical system (second eyepiece optical system) 2R when viewed from the centerline. Thereby, even in a case where the PD is adjusted so that the image display units 3L and 3R are closest to each other (as in the state illustrated in FIG. 4B), interference between the driving unit (first driving unit) 7L and the driving unit (second driving unit) 7R can be avoided. As illustrated in FIGS. 5A and 5B, in a case where the driving unit 7 and the holding member 4 are connected in the X-axis direction on the side where the second guide unit 4b and the shaft member 6 are disposed and the PD is adjusted so as to change the state from the state illustrated in FIG. 5A to the state illustrated in FIG. 5B, the driving units 7L and 7R interfere with each other. In addition, since the first guide unit 4a has the two engagement holes aligned in the Z-axis direction, twisting between the guide units 4a and 4b and the shaft member 5 during the transmission of the driving force can be suppressed by bringing the location to which the driving force is transmitted by the driving unit 7 closer to the first guide unit 4a.

As described above, the configuration according to this embodiment can provide an image display apparatus that is thin and small in the direction orthogonal to the optical axis.

Second Embodiment

Figure 6A:
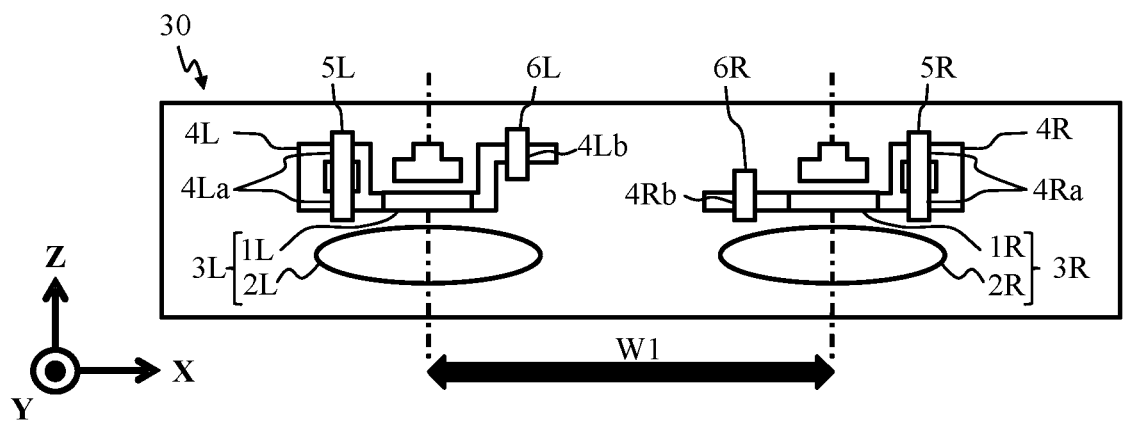
FIGS. 6A and 6B are configuration diagrams of an HMD according to a second embodiment.
Figure 6B:
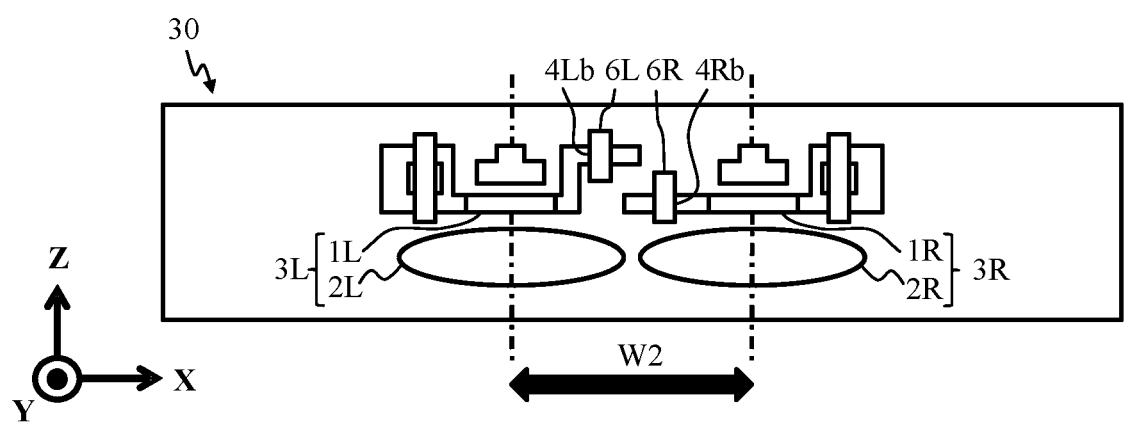

FIGS. 6A and 6B are configuration diagrams of an HMD 30 according to this embodiment. This embodiment is similar to the first embodiment except for the shape of the holding member 4. This embodiment will discuss only parts that are different from the first embodiment.

The holding members 4L and 4R have shapes different from each other. The second guide units 4Lb and 4Rb are located at different positions in the Z-axis direction. More specifically, the second guide unit 4Lb is provided on the +Z direction side of the second guide unit 4Rb. The shaft member 6L engaged with the second guide unit 4Lb is also provided on the +Z direction side of the shaft member 6R engaged with the second guide unit 4Rb. Since the second guide unit 4Lb has one engagement hole in the Z-axis direction, the second guide unit 4Lb can be made smaller in the Z-axis direction than that of the first guide unit 4La. Similarly, the shaft member 6 can be made smaller in the Z-axis direction than shaft member 5. Therefore, even in a case where the PD is adjusted so that the distance between the image display units 3L and 3R are shortest, the configuration including the second guide unit 4Lb and the shaft member 6L and the configuration including the second guide unit 4Rb and the shaft member 6R are do not interfere with each other. This configuration can suppress an increase in the size of the HMD 30 in the X-axis direction.

The effect of this embodiment can be obtained in a case where at least part of the peripheral structure of the second guide unit 4b is disposed outside the projection range of the eyepiece optical system 2 when viewed from the −Z direction side due to rigidity and the like. Since the second guide unit 4b and the shaft member 6 are disposed so that they overlap the eyepiece optical system 2, these members do not originally interfere with other members in the structures of the left and right eyes.

As described above, the configuration according to this embodiment can provide an image display apparatus that is thin and small in the direction orthogonal to the optical axis.

Third Embodiment

Figure 7:
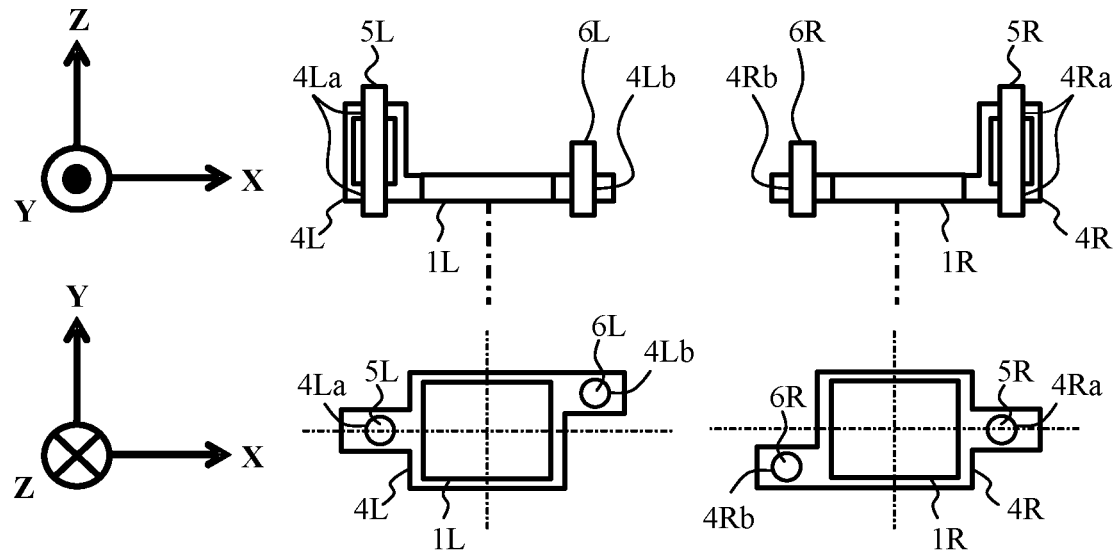
FIG. 7 is a configuration diagram of an HMD according to a third embodiment.

FIG. 7 is a configuration diagram of the HMD 30 according to this embodiment. This embodiment is similar to the first embodiment except for the shape of the holding member 4. This embodiment will discuss only parts that are different from the first embodiment.

The holding members 4L and 4R have shapes different from each other. The second guide units 4Lb and 4Rb are provided at different positions in the Y-axis direction. More specifically, the second guide unit 4Lb is provided on the +Y direction side of the second guide unit 4Rb. Therefore, even in a case where the PD is adjusted so that the distance between the image display units 3L and 3R are shortest, the configuration including the second guide unit 4Lb and the shaft member 6L and the configuration including the second guide unit 4Rb and the shaft member 6R are do not interfere with each other. This configuration can suppress an increase in the size of the HMD 30 in the X-axis direction.

Since the second guide unit 4Rb and the shaft member 6R are disposed on the −Y direction side with respect to the optical axis (second optical axis) 2Ra of the eyepiece optical system (second eyepiece optical system) 2R, in this embodiment, tilting moments around the first guide unit 4a, the second guide unit 4b, and the shaft members 5 and 6 as fulcrums may occur. However, the holding member 4R has a shape obtained by rotating the holding member 4L around the optical axis 2La by 180 degrees, and components having the same shape can be assembled while they are reversed. Thereby, it becomes unnecessary to manufacture components having different shapes for the left and right eye structures.

As described above, the configuration according to this embodiment can provide an image display apparatus that is thin and small in the direction orthogonal to the optical axis.

Fourth Embodiment

Figure 8:
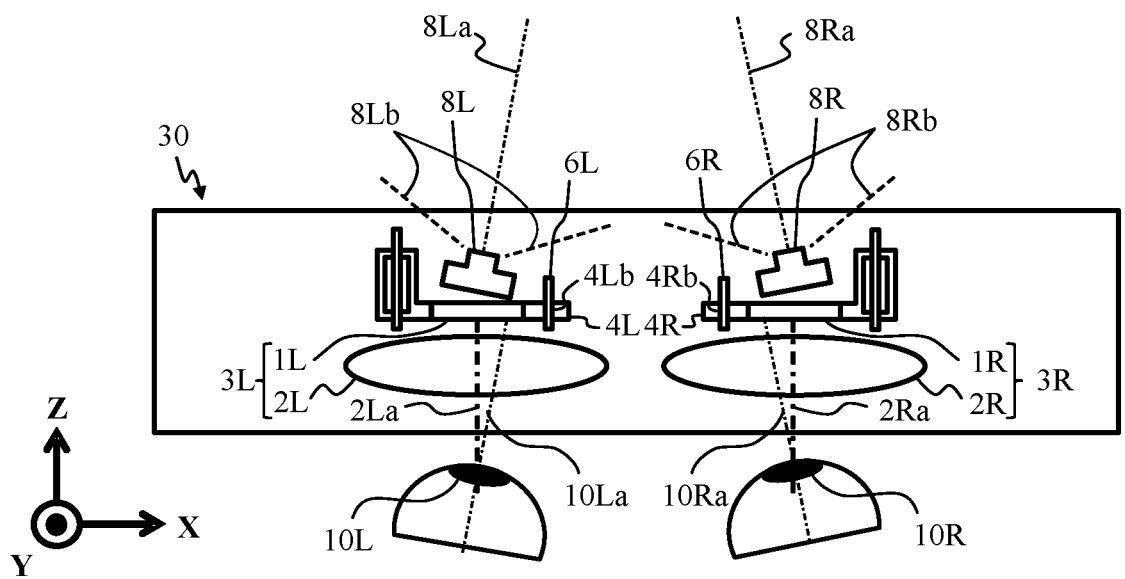
FIG. 8 is a configuration diagram of an HMD according to a fourth embodiment.

FIG. 8 is a configuration diagram of an HMD 30 according to this embodiment. This embodiment is similar to the first embodiment except for the arrangement of the imaging unit 8. This embodiment will discuss only parts that are different from the first embodiment.

In the HMD 30, the visual line of the user may tilt to the optical axis 2a of the eyepiece optical system 2. For example, in order to observe an object displayed on the display device 1 at an angle so that the user views the object in a real space, a visual line 10La of the left eye 10L and a visual line 10Ra of the right eye 10R may tilt inward to the optical axes 2La and 2Ra, respectively, as illustrated in FIG. 8. In this case, the imaging units 8L and 8R may be disposed so that imaging directions 8La and 8Ra of the imaging units 8L and 8R tilt inward similarly to the visual lines 10La and 10Ra in order to obtain the optimum images. In this embodiment, the HMD 30 includes visual line detectors (not illustrated) that each include a camera and a light projecting element and detect the visual lines 10La and 10Ra, and angle changing units (not illustrated) that each include a guide mechanism and an actuator and change the angles of the imaging units 8L and 8R, and the HMD 30 can change the imaging directions.

Figure 9:
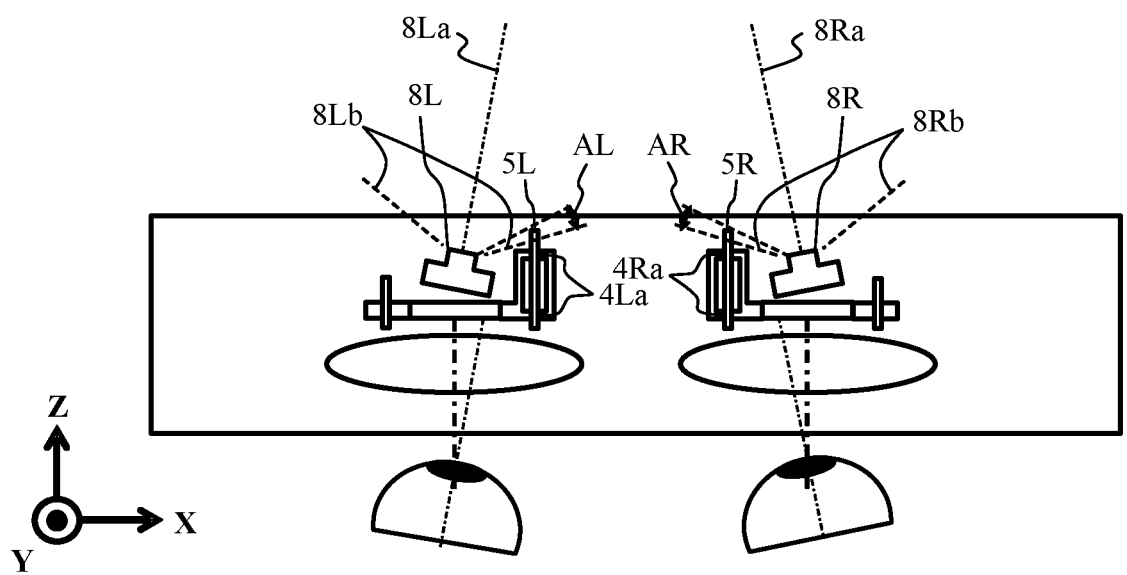
FIG. 9 explains a guide mechanism having a different configuration according to the comparative example.

The second guide unit 4Lb and shaft member 6L are disposed on the +X direction side of the image display unit 3L, and the second guide unit 4Rb and shaft member 6R are disposed on the −X direction side of the image display unit 3R. In this embodiment, even if the imaging directions 8La and 8Ra tilt inward (toward the second guide unit 4b with respect to the Z-axis direction), as illustrated in FIG. 8, the second guide unit 4b and shaft member 6 do not block the angles of view 8Lb and 8Rb of the imaging units 8L and 8R. On the other hand, as illustrated in FIG. 9, in a case where the first guide unit 4La and shaft member 5 are disposed on the +X direction side of the image display unit 3L and the first guide unit 4Ra and shaft member 5R are disposed on the −X direction side of the image display unit 3R, and the imaging directions 8La and 8Ra tilt inward, ranges AL and AR of the imaging angles of view 8Lb and 8Rb are blocked.

As described above, the configuration according to this embodiment can provide an image display apparatus that is thin and small in the direction orthogonal to the optical axis.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-020614, filed on Feb. 14, 2022, which is hereby incorporated by reference herein in its entirety.

What is claimed is:

1. An image display apparatus comprising:
   a display device configured to display an image to a user;
   an eyepiece optical system configured to guide the image displayed on the display device to the user; and
   a guide mechanism configured to move the display device in an optical axis direction of the eyepiece optical system,
   wherein the guide mechanism guides a movement of the display device on both sides of the display device in a direction orthogonal to an optical axis of the eyepiece optical system, and overlaps the eyepiece optical system when viewed from the optical axis direction.

2. The image display apparatus according to claim 1, wherein the display device includes a first display device configured to display an image for a left eye of the user and a second display device configured to display an image for a right eye of the user,
   wherein the eyepiece optical system includes a first eyepiece optical system configured to guide the image displayed on the first display device to the left eye and a second eyepiece optical system configured to guide the image displayed on the second display device to the right eye,
   wherein the guide mechanism includes a first guide mechanism configured to move the first display device in the optical axis direction and a second guide mechanism configured to move the second display device in the optical axis direction,
   wherein the first guide mechanism guides a movement of the first display device on both sides of the first display device in an arrangement direction of the first display device and the second display device, and is disposed so as to overlap the first eyepiece optical system when viewed from the optical axis direction, and
   wherein the second guide mechanism guides a movement of the second display device on both sides of the second display device in the arrangement direction, and is disposed so as to overlap the second eyepiece optical system when viewed from the optical axis direction.

3. The image display apparatus according to claim 2, further comprising:
   a first driving unit configured to drive the first guide mechanism and connected to the first guide mechanism outside a first optical axis of the first eyepiece optical system when viewed from a centerline between the first optical axis and a second optical axis of the second eyepiece optical system; and
   a second driving unit configured to drive the second guide mechanism and connected to the second guide mechanism outside the second optical axis of the second eyepiece optical system when viewed from the centerline.

4. The image display apparatus according to claim 2, wherein the first guide mechanism and the second guide mechanism each include a first shaft member, a second shaft member, a first guide unit engaged with the first shaft member at a plurality of points, and a second guide unit engaged with the second shaft member at locations fewer than those for the first shaft member and the first guide unit,
   wherein a positional relationship in the optical axis direction between the first guide unit and the first shaft member is changeable and a positional relationship in the optical axis direction between the second guide unit and the second shaft member is changeable,
   wherein in the arrangement direction, the first guide unit is disposed outside the optical axis of the eyepiece optical system when viewed from a centerline between a first optical axis of the first eyepiece optical system and a second optical axis of the second eyepiece optical system, and
   wherein in the arrangement direction, the second guide unit is disposed inside the optical axis when viewed from the centerline.

5. The image display apparatus according to claim 4, further comprising an imaging unit configured to acquire the image to be displayed on the display device, wherein the imaging unit has a changeable imaging direction,
   wherein in a case where the imaging direction tilts to the optical axis direction toward a side of the second guide unit, the second guide unit does not block an angle of view of the imaging unit.

6. The image display apparatus according to claim 2, wherein the first guide mechanism and the second guide mechanism are disposed only on one side of the optical axis in a direction orthogonal to the optical axis direction and the arrangement direction.

7. The image display apparatus according to claim 4, wherein the second guide unit provided to the first guide mechanism and the second guide unit provided to the second guide mechanism are located at different positions in the optical axis direction.

8. The image display apparatus according to claim 4, wherein the second guide unit provided to the first guide mechanism and the second guide unit provided to the second guide mechanism are located at different positions in a direction orthogonal to the optical axis direction and the arrangement direction.

9. The image display apparatus according to claim 7, further comprising an adjusting unit configured to change a distance between the first display device and the second display device in the arrangement direction, wherein in a case where the distance is changed to the shortest distance by the adjusting unit, a configuration including the second guide unit provided to the first guide mechanism and a configuration including the second guide unit provided to the second guide mechanism does not interfere with each other.

10. The image display apparatus according to claim 1, further comprising an imaging unit configured to acquire the image to be displayed on the display device, wherein the guide mechanism is disposed so as to overlap the imaging unit in the optical axis direction.

* * * * *